July 24, 1928.
J. L. DRAKE
1,678,060
SHEET GLASS PRODUCING APPARATUS
Filed June 21, 1926
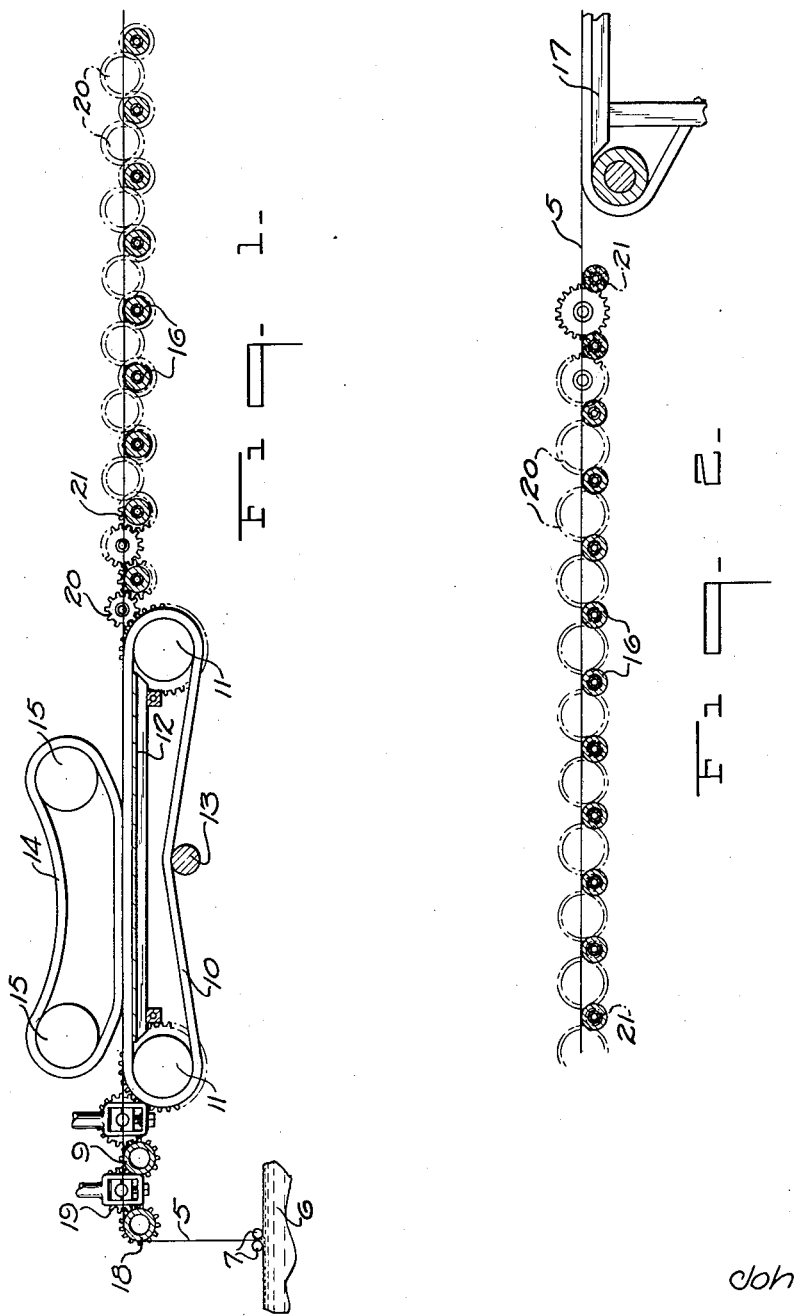
Inventor
John L. Drake.
By Frank Fraser
Attorney Patented July 24, 1928.

1,678,060

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-PRODUCING APPARATUS.

Application filed June 21, 1926. Serial No. 117,280.

The present invention relates to an improved process and apparatus for producing sheet glass.

An important object of the invention is to provide an apparatus wherein a sheet of glass may be continuously produced from a mass of molten glass, the apparatus being so constructed and operated that the sheet is under a slight tension from the time it begins to take form until it has become finally set.

Another object of the invention is to provide an improved process and apparatus for producing sheet glass wherein a sheet is continuously produced from a mass of molten glass, the apparatus including a plurality of rotatable surfaces so driven that the peripheral speeds of the moving parts become progressively faster from the point of formation of said sheet.

A still further object of the invention is to provide an apparatus of this nature wherein a positively driven roll is arranged above a mass of molten glass, the roll being so operated that a sheet of glass may be continuously drawn from said molten mass and deflected thereover, the apparatus including a supplementary roll or rolls, a flattening member and an annealing leer, the speed of the surface of the flattening table being relatively faster than the peripheral speed of the drawing and deflecting roll, while the peripheral speed of the rolls in said leer is faster than the speed of the flattening member.

Other objects and advantages of the invention will become apparent during the course of the following description.

In the drawings wherein like numerals are employed to designate like parts throughout the same, Fig. 1 is a diagrammatic view of a sheet producing apparatus, including a portion of the leer, and Fig. 2 is a diagrammatic view illustrating the outlet portion of the leer, and a cutting table.

The diagrammatic representations in Figs. 1 and 2 represent an improved form of apparatus as set forth in Colburn Patent No. 1,248,809, granted December 4, 1917, but it is to be understood that the same invention can be applied equally as well to any of the other well known types of machines.

In the Colburn machine a sheet 5, designated in Fig. 1, is continuously drawn from a mass of molten glass 6, the sheet being held to width by means of rotatable knurled rolls 7. The numeral 8 designates a rotatable roll arranged above the mass of molten glass 6 and over which the sheet 5 is adapted to be deflected from a vertical plane to a horizontal plane. After the sheet has been deflected over the member 8 it passes over a so-called idler roll 9 and draw table 10. The draw table 10 ordinarily comprises a plurality of links coupled together in an endless belt formation, being driven by means of the drums 11. The draw table 10 in its upper horizontal run is dragged over draw table rails 12, while the lower run of the belt is trained about an idler or tightening member 13. A plurality of clamp bars are connected in an endless belt formation, as indicated by the numeral 14, being supported and driven by means of the drums or sprockets 15. The clamp bars are so constructed that they engage the edges of the sheet produced by the knurled rolls 7, clamping the sheet edges between the draw table 10 and the clamp bars. The sheet then passes through an annealing leer, being supported upon the rotatable rolls 16, the sheet issuing from the leer upon a cutting table 17.

In the operation of the Colburn machine heretofore, the bending roll 8 has been permitted to idle in its bearings so that it is driven by reason of frictional contact with the sheet 5. The drawing force has been exerted heretofore by the draw table 10, which also serves as a flattening table.

In the present invention the apparatus just described is operated in a different manner. In accordance with my new application, the bending roll 8 is provided with a suitable drive gear 18 which is indicated diagrammatically, and may be positively driven by a gear 19 or any other suitable means. By positively driving the bending member 8 the speed of draw from the molten glass 6 will be dependent upon the peripheral speed of said bending roll. The bending roll presents a uniform surface so that a uniform drawing force will be applied to the sheet being formed. It is to be understood that the height of the bending member 8 may vary as desired. The second roll 9 is also positively driven and is so geared that the peripheral speed thereof is slightly greater than the peripheral speed of the bending member, which, in the present case, also acts as a drawing member. The peripheral speed of the roll 9 being greater than the peripheral speed of the roll 8, places the sheet 5 between the two under a slight tension so that there will be no tendency for the sheet to buckle. The member 10, which is ordinarily used as a draw table, is in the present case used as a flattening table, and may be formed by associating a plurality of links, or by suitably training a metal sheet or an asbestos sheet about said rolls. The clamp bars 14 may or may not be used, as desired. The linear speed of the table 9 is so controlled by the driving gears or drums 11 that it is slightly faster than the peripheral speed of the roll 9.

As is clearly shown in a diagrammatic manner, the leer rolls 16 are positively driven as by means of gears 20 cooperating with the gears 21, carried by the end of said leer rolls. The ratio of the gears is such that the leer rolls are driven progressively faster from the intake end or hot end of the leer toward the outlet end or cutting table end thereof. The sheet 5 is thus under a tension from the mass of molten glass 6 to the cutting table 17 where it may be divided into suitable lengths.

The table 10 and roll 9 may be so geared that they both act as drawing means, although I prefer to use the roll 8 by itself for such purpose. Although the peripheral speeds of the various rotatable members become progressively faster, I prefer to keep the speeds down to a point where there will be no appreciable slippage of the sheet over said members. However, if it is desired, the various members may be formed from a metal such as nickel or covered with a material such as asbestos, so that slippage or relative movement between the sheet and said parts will not harm the surface of the sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means for drawing a sheet upwardly from a mass of molten glass, and a flattening member for said sheet arranged after the drawing means, the peripheral speed of the drawing means being relatively slower than the peripheral speed of the flattening member.

2. In sheet glass apparatus, means for drawing a sheet upwardly from a mass of molten glass, a flattening member for said sheet ararnged after the drawing means, and means for driving the drawing means relatively slower than the flattening member so that the said sheet of glass will be under tension.

3. In sheet glass apparatus, a container for a mass of molten glass, a positively driven roll arranged thereabove, said roll being adapted for continuously drawing a sheet upwardly from said mass of glass and for deflecting the same into a substantially horizontal plane, a flattening table for said sheet, and means for moving the flattening table at a relatively faster speed than the speed of said roll.

4. In sheet glass apparatus, a drawing roll, a flattening member, and an annealing leer including a plurality of supporting members, and means for driving said drawing roll and flattening and supporting members in a manner that the surface speed thereof becomes relatively faster from said drawing roll on.

5. The process of producing sheet glass, consisting in drawing a sheet of glass initially in a vertical plane and then deflecting it into a substantially horizontal plane, and maintaining said sheet under tension from its time of formation until it has become set.

6. The process of producing sheet glass, consisting in continuously drawing a sheet upwardly from a mass of molten glass, and maintaining said sheet under tension from the time of its formation until it has become finally set.

7. The process of producing glass, consisting in drawing a sheet upwardly from a mass of molten glass and deflecting it into a substantially horizontal plane about a moving surface, and supporting and conveying said sheet horizontally on moving surfaces, the deflecting surface and supporting surfaces being moved at progressively increasing speeds from the point of formation of said sheet.

8. In sheet glass apparatus, rotatable means for drawing a sheet of glass upwardly from a mass of molten glass and deflecting it into a substantially horizontal plane, and rotatable flattening means for receiving said sheet after it has been deflected, the peripheral speed of said drawing means being relatively slower than the peripheral speed of said flattening means.

9. In sheet glass apparatus, a rotatable member for drawing a sheet of glass upwardly from a mass of molten glass and deflecting it into a substantially horizontal plane, a rotatable flattening member for receiving said sheet after it has been deflected, and means for driving said drawing member relatively slower than said flattening member so that the said sheet of glass will be under tension.

10. In sheet glass apparatus, a rotatable roll for drawing a sheet of glass upwardly from a mass of molten glass and deflecting it into a substantially horizontal plane, an endless horizontally arranged flattening table for receiving the glass after it has been deflected, and means for moving the flattening table at a relatively faster speed than the speed of said roll.

11. In sheet glass apparatus, rotatable means for drawing a sheet of glass upwardly from a mass of molten glass and deflecting it into a substantially horizontal plane, rotatable flattening means for receiving said sheet after it has been deflected, and rotatable supporting means for receiving the glass from said flattening means, said drawing means, flattening means and supporting means being driven at progressively increasing speeds from said drawing means to said supporting means.

12. In sheet glass apparatus, a rotatable member for drawing a sheet of glass upwardly from a mass of molten glass and deflecting it into a substantially horizontal plane, a rotatable flattening member for receiving the glass after it has been deflected, rotatable supporting members for receiving the glass from said flattening member, and means for driving said members in a manner that the peripheral speed of said members becomes progressively greater from the point of formation of said sheet.

13. In sheet glass apparatus, a rotatable roll for drawing a sheet of glass upwardly from a mass of molten glass and deflecting it into a substantially horizontal plane, an endless horizontally arranged flattening table for receiving the glass after it has been deflected, an annealing leer in proximity to said flattening table and including a plurality of supporting rolls therein, and means for driving said drawing roll, flattening table and supporting rolls in a manner that the sheet is always under a relative tension.

14. In sheet glass apparatus, a drawing member, a flattening member and a plurality of supporting members, and means for driving said members in a manner that the surface speed thereof becomes relatively faster from the drawing member on.

Signed at Toledo, in the county of Lucas, and State of Ohio, this 18th day of June, 1926.

JOHN L. DRAKE.